United States Patent
Takeda et al.

(10) Patent No.: US 7,457,721 B2
(45) Date of Patent: Nov. 25, 2008

(54) METHOD AND APPARATUS FOR MEASURING SMALL DISPLACEMENT

(75) Inventors: Mitsuo Takeda, Hachioji (JP); Wei Wang, Kodaira (JP); Nobuo Ishii, Chofu (JP); Yoko Miyamoto, Chofu (JP)

(73) Assignee: The University of Electro-Communications, Tokyo (JP)

(*) Notice: Subject to any disclaimer, the term of this patent is extended or adjusted under 35 U.S.C. 154(b) by 0 days.

(21) Appl. No.: 11/587,142

(22) PCT Filed: Apr. 22, 2005

(86) PCT No.: PCT/JP2005/007683
§ 371 (c)(1),
(2), (4) Date: Feb. 14, 2007

(87) PCT Pub. No.: WO2005/103610
PCT Pub. Date: Nov. 3, 2005

(65) Prior Publication Data
US 2007/0219745 A1 Sep. 20, 2007

Related U.S. Application Data

(60) Provisional application No. 60/564,433, filed on Apr. 22, 2004.

(51) Int. Cl.
*G01B 11/00* (2006.01)
*G06F 19/00* (2006.01)

(52) U.S. Cl. .............. 702/158; 356/300; 356/302; 356/303; 356/450; 356/451; 356/496; 356/498; 382/100; 702/127; 702/155; 702/189

(58) Field of Classification Search .......... 356/300, 356/302, 303, 450, 451, 496, 498; 382/100, 382/106; 702/1, 127, 155, 158, 189
See application file for complete search history.

(56) References Cited

U.S. PATENT DOCUMENTS 2,848,921 A * 8/1958 Koulikovitch .............. 356/498

(Continued)

FOREIGN PATENT DOCUMENTS

| JP | 06-223180 A | 8/1994 |
|----|-------------|--------|
| JP | 2000-055640 A | 2/2000 |
| JP | 3035654 B | 2/2000 |
| JP | 2005-316758 A * | 11/2005 |

OTHER PUBLICATIONS

Optics Japan 2003 Extended Abstracts; Dec. 8-9, 2003; XiX, 402-405.
Photonics Europe; Apr. 26-30, 2004; 154-155.

*Primary Examiner*—Edward R Cosimano
(74) *Attorney, Agent, or Firm*—NDQ&M Watchstone LLP

(57) ABSTRACT

Without using an interferometer, small displacement and/or three-dimensional shape of an object is detected in a noncontact way with high accuracy using pseudo-phase information calculated from e.g., a speckle pattern having a spatially random structure. A speckle image of the test object of the before displacement is obtained, and a spatial frequency spectrum is calculated by executing an N-dimensional Fourier transform for this. The complex analytic signal is obtained by setting the amplitude of frequency spectrum in the half plane including zero frequency in this amplitude distribution to zero, and executing the frequency spectrum amplitude in the half plane of the remainder in the inverse Fourier transform. And then, the amplitude value of this complex analytic signal is replaced with the constant value, a part of the obtained analytic signal domain is clipped, the phase information is calculated by the phase-only correlation function, and the cross-correlation peak in N-dimension is obtained. The displacement magnitude can be obtained by executing the above-mentioned method to the after displacement of the test object, and obtaining the difference of the cross-correlation peak before and after the displacement.

6 Claims, 12 Drawing Sheets

U.S. PATENT DOCUMENTS 3,344,701 A * 10/1967 Rantsch ................... 356/498
4,674,045 A *  6/1987 Kerber et al. ............. 382/260
5,148,502 A *  9/1992 Tsujiuchi et al. .......... 382/255
5,198,896 A *  3/1993 Kondo et al. ........... 348/207.99
6,195,460 B1   2/2001 Kobayashi et al.

* cited by examiner

FIG. 1
(a) $g_1(x, y)$
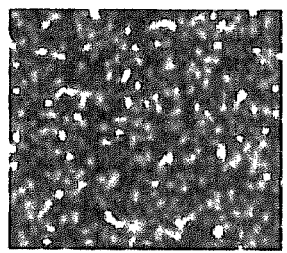
$F$ ⇩ FOURIER TRANSFORM
$G_1(f_X, f_Y)$
(b)
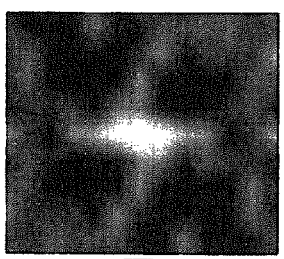
$H$ ⇩ EXTRACT HALF OR PART OF FREQUENCY SPECTRUM
$H(f_X, f_Y)G_1(f_X, f_Y)$
(c)
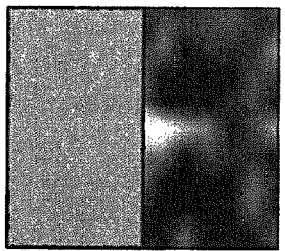
$F^{-1}$ ⇩ INVERSE FOURIER TRANSFORM
$\hat{g}_1(x, y)$
(d)
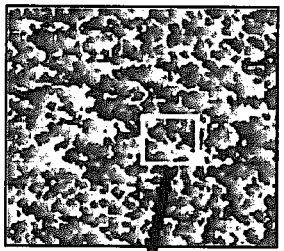
$W$
$\tilde{g}_1(x, y)$
(e)

FIG. 2
(a) $g_2(x, y)$
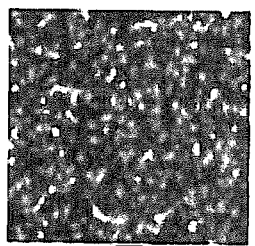
$F \Downarrow$ FOURIER TRANSFORM
$G_2(f_X, f_Y)$
(b)
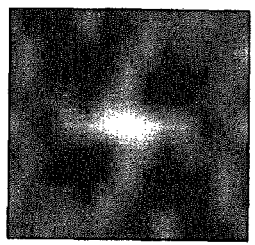
$H \Downarrow$ EXTRACT HALF OR PART OF FREQUENCY SPECTRUM
$H(f_X, f_Y)G_2(f_X, f_Y)$
(c)
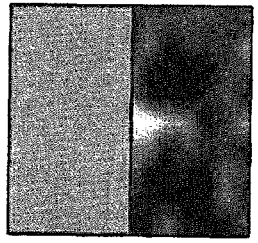
$F^{-1} \Downarrow$ INVERSE FOURIER TRANSFORM
$\hat{g}_2(x, y)$
(d)
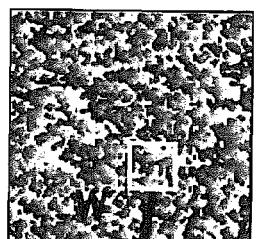
(e) $\tilde{g}_2(x, y)$

PHASE-ONLY IN SPATIAL SIGNAL DOMAIN

PHASE-ONLY IN SPATIAL FREQUENCY DOMAIN

METHOD AND APPARATUS FOR MEASURING SMALL DISPLACEMENT

TECHNICAL FIELD

The present invention pertains to a method and an apparatus for measuring small displacement to measure small displacement or the three-dimensional shape of an object in a noncontact way as an indication of which a pattern or a texture having a random structure spatially such as a laser speckle pattern and a random dot pattern. In particular, the present invention pertains to the method and the apparatus for measuring the small displacement to achieve a highly accurate noncontact measurement by using pseudo-phase information of which being had by an analytic signal in such a pattern.

BACKGROUND ART

Recently, the technology for measuring small displacement of the object in a noncontact way as an indication of which a pattern or a texture having a random structure spatially such as a laser speckle pattern and a random dot pattern has been noted. In particular, this technology occupies an important position in the industrial application fields such as a non-destructive inspection and a material strength examination.

Conventionally, displacement sensing of the spatial pattern having the random structure has been operated by following methods according to the above-mentioned background. That is, the first method is a method to take a picture of a light intensity distribution of the pattern respectively with a camera before and after giving displacement, calculate a cross-correlation function directly in the spatial signal domain of this light intensity distribution, and obtain the direction of displacement and the displacement magnitude from the peak position. The second method is a method to perform the mathematical process equivalent to the above-mentioned method completely in the spatial frequency domain. In other words, the above-mentioned method is a method to execute a Fourier transform of two spatial patterns after and before the displacement respectively, select another complex conjugate of the obtained spatial frequency spectrum, create a composite spectrum to cross this on the other hand, and to further execute an inverse Fourier transform for this and obtain the cross-correlation function.

However, since the cross-correlation function obtained by using the above-mentioned two methods is basically an intensity correlation function calculated directly from the light intensity distribution of the spatial pattern itself, there is a problem of being susceptible to the influence of a nonlinearity characterization of the sensibility of the camera to detect the light intensity and a quantum noise easily.

On the other hand, in the field of a communication theory, it is known that the phase information is more robust than the intensity information of the signal to the nonlinearity characteristic of the detector and the quantization noise. This means that it is possible to improve the performance of a displacement measuring apparatus if the phase information of the signal is used instead of the conventional correlation function using the intensity information directly in order to calculate the correlation function.

The phase-only correlation method disclosed in "patent document 1" listed below is well-known as the calculation method of the correlation function using such the phase information. This method is a method to control the amplitude of the above-mentioned composite spectrum which is complex function according to making constantly or a logarithmic transform, etc., create an amplitude-limited complex composite spectrum which consists only from the phase information, execute an inverse Fourier transform for this, and obtain the cross-correlation function.

[Patent document 1] Japanese patent Publication No. 3035654.

DISCLOSURE OF INVENTION

The method disclosed in the above-mentioned "patent document 1" is that the used phase information is the phase information of the spatial frequency spectrum of the spatial pattern, and is not a phase of the spatial pattern in the signal domain where the signal detection and the quantization are operated.

Moreover, since the amplitude-limited and the operation of the amplitude control in the spatial frequency spectrum region operated by using the above-mentioned method are the operations to stress a high-frequency component of the spatial frequency spectrum of the random pattern, there is a problem that a high frequency noise is also stressed while there is an advantage to sharpen the correlation function. Therefore, for example, since the decrease of a rapid correlation peak value occurs when the laser speckle pattern accompanies the modifying of the pattern with a transversal displacement, there is a problem that the mis-measurement is occurred easily by the decrease of the correlation peak value.

In addition, the above-mentioned method uses the phase information in the frequency domain. However, since the correlation function in the signal domain obtained by executing the inverse Fourier transform of the phase information is the intensity correlation function in the state that high frequency is enhanced, the above-mentioned method cannot essentially solve the above-mentioned problem.

Moreover, although it is necessary to use an interferometer to detect the phase of light as wave motion with a photodetector that has a sensitivity only to the light intensity, the measurement system with an interferometer becomes complex. In addition, since the interferometer is susceptible to the influence by the vibration and the fluctuation of air easily, there is a problem that the interferometer is unsuitable to use in the field with bad environment.

The present invention is realized considering the above-mentioned problem, and it is aimed to provide a method and apparatus for measuring small displacement to detect a small displacement or a three-dimensional shape of an object in a noncontact way by using the pseudo-phase information of being had by an analytic signal in a spatial random pattern without using an interferometer.

In order to achieve the above-mentioned aim, the first gist of a method for measuring small displacement according to the present invention is to include: a first taking image step for taking image of a surface of a measuring object; a first Fourier transform step for transforming the image taken by the first take image step by using an N-dimensional Fourier transform (where N=1 or 2); a first Hilbert transform step for replacing an amplitude of frequency spectrum of half or a part of in-plane including zero frequency of the frequency spectrum transformed by the first Fourier transform step with zero; a first frequency extraction step for extracting a frequency component from the frequency spectrum after the first Hilbert transform step; a first inverse Fourier transform step for transforming the frequency component by using an N-dimension inverse Fourier transform (where N=1 or 2) and then obtaining a first complex analytic signal; a first amplitude correction step for correcting an amplitude value of the first complex analytic signal as being a constant value; a first phase-only signal recording step for recording a first phase-only analytic signal to which the amplitude is corrected; a second take image step for taking image of the surface of the measuring object, on the other hand, after the first taking image step; a second Fourier transform step for transforming the image taken by the second taking image step by using the N-dimensional Fourier transform (where N=1 or 2); a second Hilbert transform step for replacing an amplitude of frequency spectrum of half or a part of in-plane including zero frequency of the frequency spectrum transformed by the second Fourier transform step with zero; a second frequency extraction step for extracting a frequency component from the frequency spectrum after the second Hilbert transform step; a second inverse Fourier transform step for transforming the frequency component by using an N-dimension inverse Fourier transform (where N=1 or 2) and then obtaining a second complex analytic signal; a second amplitude correction step for correcting an amplitude value of the second complex analytic signal as being a constant value; a second phase-only signal recording step for recording a second phase-only analytic signal to which the amplitude is corrected; a phase-only correlation processing step for obtaining a phase-only cross-correlation function to entire region or a part of region of the first phase-only analytic signal and the second phase-only analytic signal; and a displacement magnitude calculation step for calculating displacement magnitude from a location of correlation peak to which the phase-only cross-correlation function shows a maximum modulus.

The second gist of the present invention is the method for measuring small displacement in the first gist, wherein the first and the second amplitude correction step use one of a amplitude-only processing method for replacing the amplitude value of the first and the second complex analytic signal with constant value, and an amplitude suppression processing method for controlling the amplitude value of the first and the second complex analytic signal to constant value by logarithmic conversion.

The third gist of the present invention is the method for measuring small displacement in the first gist, wherein in the phase-only cross-correlation process executed by the phase-only correlation processing step, one of a amplitude-only cross-correlation function and a amplitude suppression cross-correlation function is used.

The fourth gist of an apparatus for measuring small displacement according to the present invention is to include: taking image means for taking image of a surface of a measuring object; Fourier transform means for transforming the image taken by the take image means by using an N-dimensional Fourier transform (where N=1 or 2); Hilbert transform means for replacing an amplitude of frequency spectrum of half or a part of in-plane including zero frequency of the frequency spectrum transformed by the Fourier transform means with zero; frequency extraction means for extracting a frequency component from the frequency spectrum included in region other than a zero replacing region replaced with zero by the Hilbert transform means; inverse Fourier transform means for transforming the frequency component extracted by the frequency extraction means by using an N-dimension inverse Fourier transform, and then outputting a complex analytic signal; amplitude correction means for correcting an amplitude value of the complex analytic signal as being a constant value; Phase-only correlation processing means for processing a phase-only correlation process to entire region or a part of region of the signal correcting by the amplitude correction means; and displacement magnitude calculation means for calculating displacement magnitude from a location of correlation peak showing a maximum modulus of the phase-only correlation function.

The fifth gist of the present invention is the apparatus for measuring small displacement described in the fourth gist, wherein the amplitude correction section comprises one of a phase-only processing means for replacing the amplitude value of the complex analytic signal with constant value, and an amplitude suppression processing means for controlling the amplitude value of the complex analytic signal to constant value by logarithmic conversion.

The sixth gist of the present invention is the apparatus for measuring small displacement described in the fourth gist, wherein the phase-only cross-correlation processing means use one of a amplitude-only cross-correlation function and a amplitude suppression cross-correlation function.

According to the method and the apparatus for measuring small displacement of the present invention, the small displacement and the three-dimensional shape of the object can be detected in the noncontact way with high accuracy by using the pseudo-phase information of being had by the analytic signal pattern calculated from the speckle pattern and the random dot pattern which spatially haves the random structure without using the interferometer.

BRIEF DESCRIPTION OF THE DRAWINGS

FIG. 1 is a flow chart for explaining a method for measuring small displacement according to the present invention, and more specifically, processing steps to apply to a speckle image of a before displacement of a measuring object.

FIG. 2 is a flow chart showing processing steps to apply to a speckle image of an after displacement.

BEST MODE FOR CARRYING OUT THE INVENTION

Hereafter, a mode of preferred for carrying out the present invention will be described referring to the figures.

Figure 3:
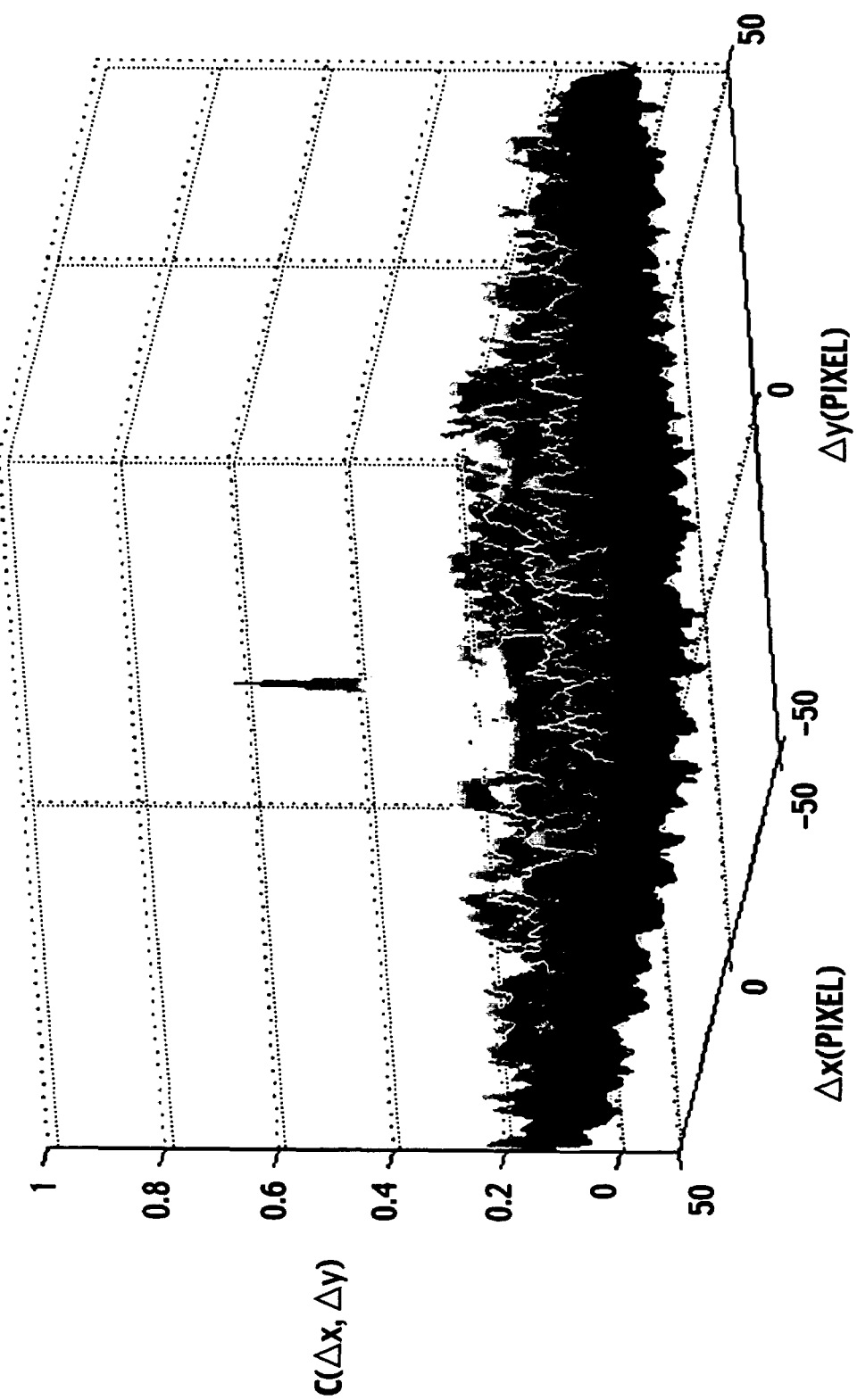
FIG. 3 is an illustration showing an absolute value distribution of a complex correlation function obtained by the processes shown in FIG. 1 and FIG. 2.

FIG. 1 is a flow chart for explaining a small displacement measuring method according to the present invention, and more specifically, processing steps to apply to a speckle image of a before displacement of a measuring object. FIG. 2 is a flow chart showing processing steps to apply to a speckle image of an after displacement. FIG. 3 is an illustration showing an absolute value distribution of a complex correlation function obtained by the processes shown in FIG. 1 and FIG. 2.

In this small displacement measuring method, first of all, a speckle image on the surface of a test object which is a measuring object is taken by using an imaging system, an N-dimensional Fourier transform (where N=1 or 2) is executed for this image, and then a frequency spectrum is obtained. Thereafter, an amplitude of frequency spectrum of half or a part of the in-plane including zero frequency of this frequency spectrum is replaced with zero, a frequency component is extracted from the frequency spectrum of the remainder not replaced, an N-dimension inverse Fourier is executed for this frequency component, and a first complex analytic signal is obtained. Thereafter, first phase information is obtained by correcting the amplitude value of this first complex analytic signal to a constant value.

On the other hand, after the predetermined time passes from the above-mentioned step which takes the surface of the test object, a speckle image on the surface of the object is taken by the above-mentioned similar method, and the N-dimensional Fourier transform (where N=1 or 2) is executed for this image. Then, an amplitude of frequency spectrum of half or a part in the in-plane including zero frequency of this frequency spectrum included in this image is replaced with zero, a frequency component is extracted from the frequency spectrum of the remainder, N dimension inverse Fourier transform is executed for this, and a second complex analytic signal is obtained. Thereafter, second phase information is obtained by correcting the amplitude value of the second complex analytic signal to a constant value.

And then, a local displacement in each location of the test object is detected from the location of the correlation peak to which a local cross-correlation function of two phase-only complex analytic signals having the first phase information and the second phase information obtained respectively by the above-mentioned method shows the maximum modulus.

Here, one of the characteristics of the present invention is to execute the phase-only operation for the complex analysis of the spatial pattern in the signal domain where the signal detection and the quantization and to use the phase information of the signal domain, instead of the phase-only operation of the spatial pattern used in conventional phase-only correlation modulo in the spatial frequency spectrum region. According to this, a highly accurate pattern displacement having a nonlinearity and a noise since conventional can be detected for a nonlinearity characterization and a quantum noise of having by the imaging system. As a result, this highly accurate measurement of displacement can be performed.

Moreover, the signal processing can be performed without stressing the high frequency noise by executing the phase-only operation of the signal domain instead of the phase-only operation in the frequency domain. According to this, for example, even if the laser speckle pattern is to transform the pattern with the transversal displacement, occurring of the mis-measurement which occurs due to the decrease of a rapid correlation peak value can be reduced. As a result, the small displacement can be measured with a little mis-measurement. That is, the highly accurate small displacement can be measured.

Moreover, another characteristic of the present invention is to include: a Fourier transform unit taking a speckle image on the surface of a test object, and executing an N-dimension Fourier transform; a Hilbert transform unit replacing half or a part of the Fourier transformed image of an amplitude of frequency spectrum with zero; a frequency extraction unit extracting a frequency component from the frequency spectrum of the remainder after replacing; an inverse Fourier transform unit executing an N-dimension inverse Fourier transform for a frequency component, and outputting a complex analytic signal; an amplitude correction unit for a phase-only correcting an amplitude value of the complex analytic signal to a constant value; a phase-only correlation processing unit executing a phase-only correlation process to an entire region or a part of region of signal after the correcting, and calculating phase information; and a displacement magnitude calculation unit calculating a displacement magnitude from a correlation peak location showing a maximum modulus of a cross-correlation function. As a result, since the displacement magnitude of the test object can be measured without using the interferometer, a measuring apparatus can be simplified. Moreover, since it is not necessary to consider an influence of a noise etc. by a fluctuation of a vibration and the air etc. which occurs in the case with the interferometer, the phase information can surely be extracted even if measuring under a very bad environment. According to this, the pattern displacement to reduce the influence of the noise etc. can be detected. As a result, small and a highly accurate small displacement measurement which improves the noise can be achieved.

Hereafter, detailed processing steps will be described referring to FIG. 1.

FIG. 1 at (a) is an illustration showing a speckle image (it is also called the "speckle pattern")

[Number 1]

$$g_1(x,y)$$

before displacement occurs.

FIG. 1 at (b) is an illustration showing when an amplitude distribution of a spatial frequency spectrum

[Number 2]

$$G_1(f_x,f_y)$$

displayed by brightness.

Furthermore, FIG. 1 at (c) is an illustration showing a frequency component when a left hemihedry in the in-plane including zero frequency of this spatial frequency spectrum is replaced by amplitude zero. Moreover, FIG. 1 at (d) is an illustration showing a concentration as for a phase distribution of a complex analytic signal obtained by executing an inverse Fourier transform for the frequency spectrum of a right hemihedry. In addition, FIG. 1 at (e) is an illustration showing a concentration as for the phase distribution of the analytic signal in a small window W which is a measurement target clipped from FIG. 1 at (d).

First of all, as shown to FIG. 1 at (a), the speckle image of a test object

[Number 3]

$$g_1(x,y)$$

before displacement occurs is obtained.

Then, The spatial frequency spectrum

[Number 4]

$$G_1(f_x,f_y)$$

as shown in FIG. 1 at (b) is obtained by executing a 2-dimensional fast Fourier transform for this.

The image shown to FIG. 1 at (b) shows the amplitude distribution of the spatial frequency spectrum

[Number 5]

$$G_1(f_x,f_y)$$

displayed by brightness.

Next, the amplitude of frequency spectrum in the left half of the in-plane including zero frequencies of the spatial frequency spectrum

[Number 6]

$$G_1(f_x,f_y)$$

of FIG. 1 at (b) is replaced with zero (FIG. 1 at (c)).

Although the amplitude of frequency spectrum in the left half is replaced with zero in the present embodiment, it is acceptable also in the right half, the upper half, and the lower half.

Thereafter, as shown to FIG. 1 at (c), the frequency spectrum in the half plane

[Number 8]

$$H(f_x,f_y)G_1(f_x,f_y)$$

remained in the right half of the filter (it is also called a "Hilbert filter")

[Number 7]

$$H(f_x,f_y)$$

where the left half is shown by the frequency component of amplitude zero is converted by the 2-dimensional inverse fast Fourier transform, and the complex analytic signal

[Number 9]

$$\hat{g}_1(x,y)$$

is obtained.

FIG. 1 at (d) is an illustration showing a phase value of the complex analytic signal after the inverse Fourier transform displayed by the light and shade distribution.

Next, when the displacement of the complex analytic signal of phase distribution to which the concentration is displayed in FIG. 1 at (d) changes depending on the place, a local displacement in each location as for the measurement target is measured. Therefore, the analytic signal in the part in the small domain as for the measurement target is extracted by the small window W.

And then, as shown in FIG. 1 at (e), the phase distribution of the analytic signal

[Number 10]

$$\tilde{g}_1(x,y)$$

of the small domain extracted and assumed to be a measurement target is displayed in the concentration.

And, a series of similar process is executed for the speckle image

[Number 11]

$$g_2(x,y)$$

of the after displacement.

This process is shown in FIG. 2. The same process as the process of FIG. 1 is basically executed.

That is, the speckle image

[Number 12]

$$g_2(x,y)$$

after displacement occurs in the test object as first shown to FIG. 2 at (a) is obtained.

And then, the 2-dimensional Fourier transform is executed for this, and the spatial frequency spectrum

[Number 13]

$$G_2(f_x,f_y)$$

shows it to FIG. 2 at (b) is obtained.

The image shown in FIG. 2 at (b) is an illustration showing the amplitude distribution of the spatial frequency spectrum

[Number 14]

$$G_2(f_x,f_y)$$

displayed by brightness.

Next, the amplitude of frequency spectrum in the left half of the in-plane including zero frequencies of the spatial frequency spectrum

[Number 15]

$$G_2(f_x,f_y)$$

of FIG. 2 at (b) is replaced with zero (FIG. 2 at (c)).

Although the amplitude of frequency spectrum in the left half is replaced with zero in the present embodiment, it is acceptable also in the right half, the upper half, and the lower half.

Thereafter, as shown to FIG. 2 at (c), the frequency spectrum in the half plane

[Number 17]

$$H(f_x,f_y)G_2(f_x,f_y)$$

remained in the right half of the filter (it is also called a "Hilbert filter")

[Number 16]

$$H(f_x,f_y)$$

where the left half is shown by the frequency component of amplitude zero is converted by the 2-dimensional inverse fast Fourier transform, and the complex analytic signal

[Number 18]

$$\hat{g}_2(x,y)$$

is obtained.

FIG. 2 at (d) is an illustration showing a phase value of the complex analytic signal after the inverse Fourier transform displayed by the light and shade distribution.

Next, when the displacement of the complex analytic signal of phase distribution to which the concentration is displayed in FIG. 2 at (d) changes depending on the place, a local displacement in each location as for the measurement target is measured. Therefore, the analytic signal in the part in the small domain as for the measurement target is extracted by the small window W.

And then, as shown in FIG. 1 at (e), the phase distribution of the analytic signal

[Number 19]

$$\tilde{g}_2(x,y)$$

of the small domain extracted and assumed to be a measurement target is displayed in the concentration.

After the signal processing of the after displacement of the above-mentioned FIG. 2 is completed, the another phase conjugation of the signal extracted from the complex analytic signal of two speckle images of the speckle image of the before displacement

[Number 20]

$$g_1(x,y)$$

and the speckle image of the after displacement

[Number 21]

$$g_2(x,y)$$

by the small window (in this example, analytic signal after the modifying) is taken.

And then, the 2D complex cross-correlation function of the synthesis signal obtained by giving moving sidewise and crossing is obtained. At this time, by fixing the amplitude of the complex analytic signal of the speckle image like

[Number 22]

$$|\bar{g}_1(x,y)|=|\bar{g}_2(x,y)|=1,$$

the phase-only complex cross-correlation function limited only to the phase information is obtained.

This phase-only complex cross-correlation function will be shown in formula (1)

[Number 23]

$$C_p(\Delta x,\Delta y)=\int\int \exp[i(\phi_1(x,y)-\phi_2(x+\Delta x,y+\Delta y))]dxdy \quad (1)$$

where p of Cp is the cross-correlation function of an analytical function limited only to the phase information.

Here, instead of fixing the amplitude to 1, it may apply a logarithmic conversion and/or a square root manipulation to the amplitude value, and may obtain the complex cross-correlation function controlling the change in amplitude. In general, since the phase information appears to the signal via an exponent of the complex exponential function, a small space structure of the speckle image is reflected in the signal value by the high sensitivity or more. Therefore, the utility value to the measurement is high. The amplitude value of each point plays the role to put the degree of the reflection of the phase information of the respect in the correlated calculation weighting, and the phase information is not to be used easily for the correlated calculation in the small of the amplitude. It is possible to use more phase information to measure by fixing the amplitude in the signal domain or controlling the amplitude variation according to the present invention.

In addition, FIG. 3 shows the distribution of the absolute value of the complex cross-correlation function obtained by a series of above-mentioned processes. Thus, the local displacement in the region extracted by the correlation window from the location where the peak of the phase-only cross-correlation function occurs can be obtained.

Next, the composition of a small displacement measuring apparatus 1 according to the present invention will be described referring to FIG. 4.

When roughly dividing, this small displacement measuring apparatus 1 includes a test object 3, a detecting unit 5 detecting the speckle pattern obtained by irradiating light to surface of this test object 3, and an image processing unit 7 executing a image processing of speckle pattern on surface of the detected test object 3.

Here, the detecting unit 5 at least includes an optical source 51 which is an irradiation means and a camera 52 which is an imaging means. The irradiation means is a laser diode (LD), an LED, a white light source, or the like. Moreover, the camera is a highly accurate CCD camera or a CMOS camera for taking speckle pattern image. The optical radiation emitted from the optical source 51 is entered into the test object 3, and the part of it reflects and enters into the camera. The optical source 51 need not install in the detecting unit 5 as shown in FIG. 4, and may be as the composition provided outside.

The image processing unit at least includes: a first storage unit 71 (for example, frame memory etc. and it is called "FM" hereafter) temporarily storing the surface imaging data (speckle pattern) of test object 3 taken by the camera 52; a second storage unit 72 (for example, hard disk etc. and it is called "HDD" hereafter) converting this speckle pattern to a file and storing it; a Fourier transform unit 73 executing the Fourier transform for speckle pattern; a Hilbert filter processing unit 74 executing the Hilbert filter process for the spatial frequency spectrum executed by the Fourier transform; a frequency extraction unit 75 extracting a frequency component from the spatial frequency spectrum executed by the Hilbert filter; an inverse Fourier transform unit 76 executing the inverse Fourier transform for this frequency component; an amplitude correction unit 77 correcting the amplitude of the complex analytic signal obtained by the inverse Fourier transform so as a constant value; a phase-only correlation processing unit 78 executing phase-only correlation process for entire or a part of region of the correcting complex analytic signal; a displacement magnitude calculation unit 79 calculating displacement magnitude from a peak position of the absolute value of the phase-only correlation function using phase information of before displacement and phase information of after displacement calculated by the phase-only correlation process; a processing control unit 80 (for example, central processing unit and it is called "CPU" hereafter) controlling these function unit; and a third storage unit 81 (for example, read-only memory etc. and it is called "ROM" hereafter) storing these a series of process control programs. This ROM 81 stores the program described the signal processing steps explained in FIG. 1 and FIG. 2.

Moreover, display unit 9 to display the result executed by this image processing unit 7 to outside is provided outside of the image processing unit 7.

Next, an operation of this small displacement measuring apparatus 1 will be described referring to the flow chart of FIG. 5 to FIG. 7.

Figure 5:
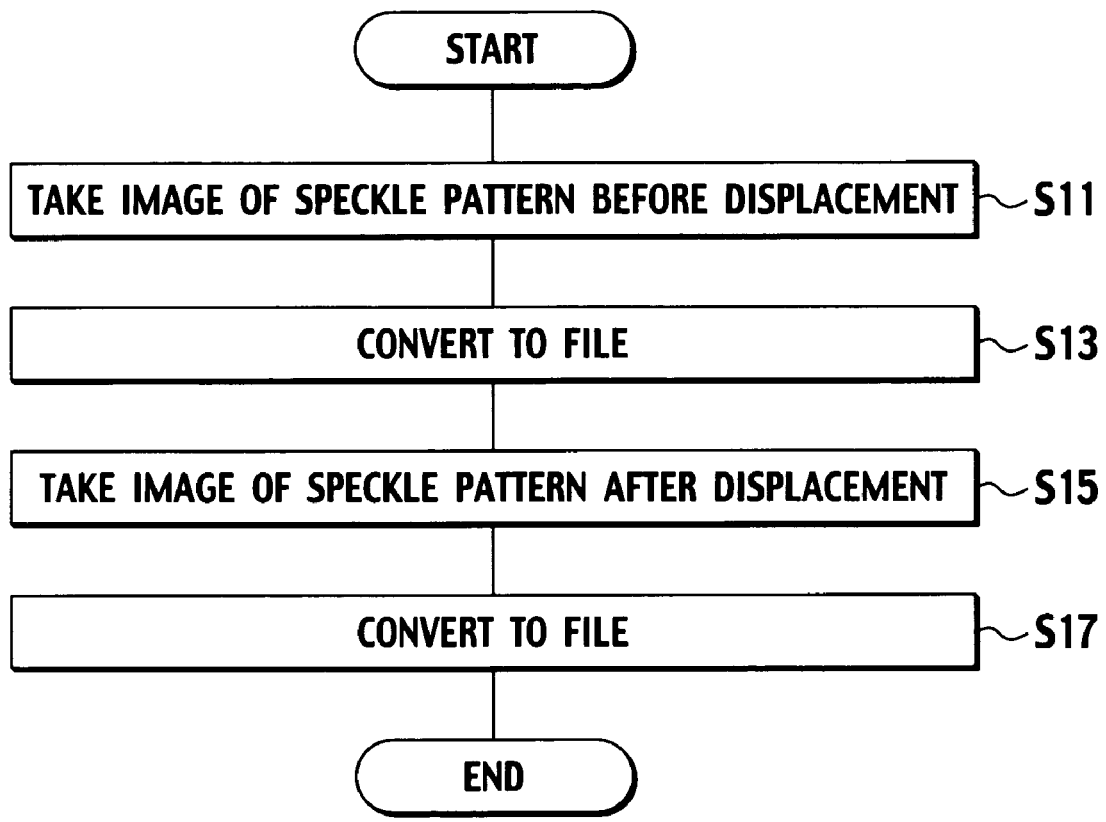
FIG. 5 is a flow chart (No. 1) for explaining an operation by the small displacement measuring apparatus 1 according to the present invention.

FIG. 5 is a flow chart showing storing steps to store the take image step to which the test object 3 is taken image and the image taken. FIG. 6 is a flowchart showing image processing steps to process the stored image. FIG. 7 is a flowchart showing displacement magnitude calculation steps to compare the two processed images and to calculate the existence or nonexistence and the displacement magnitude of the displacement of the test object 3. In addition, in this embodiment, the in-plane displacement is voluntarily occurred by rotating the test object 3, and the before displacement of the test object 3, and the speckle pattern of the after displacement are taken image respectively and the displacement magnitude is calculated.

Figure 4:
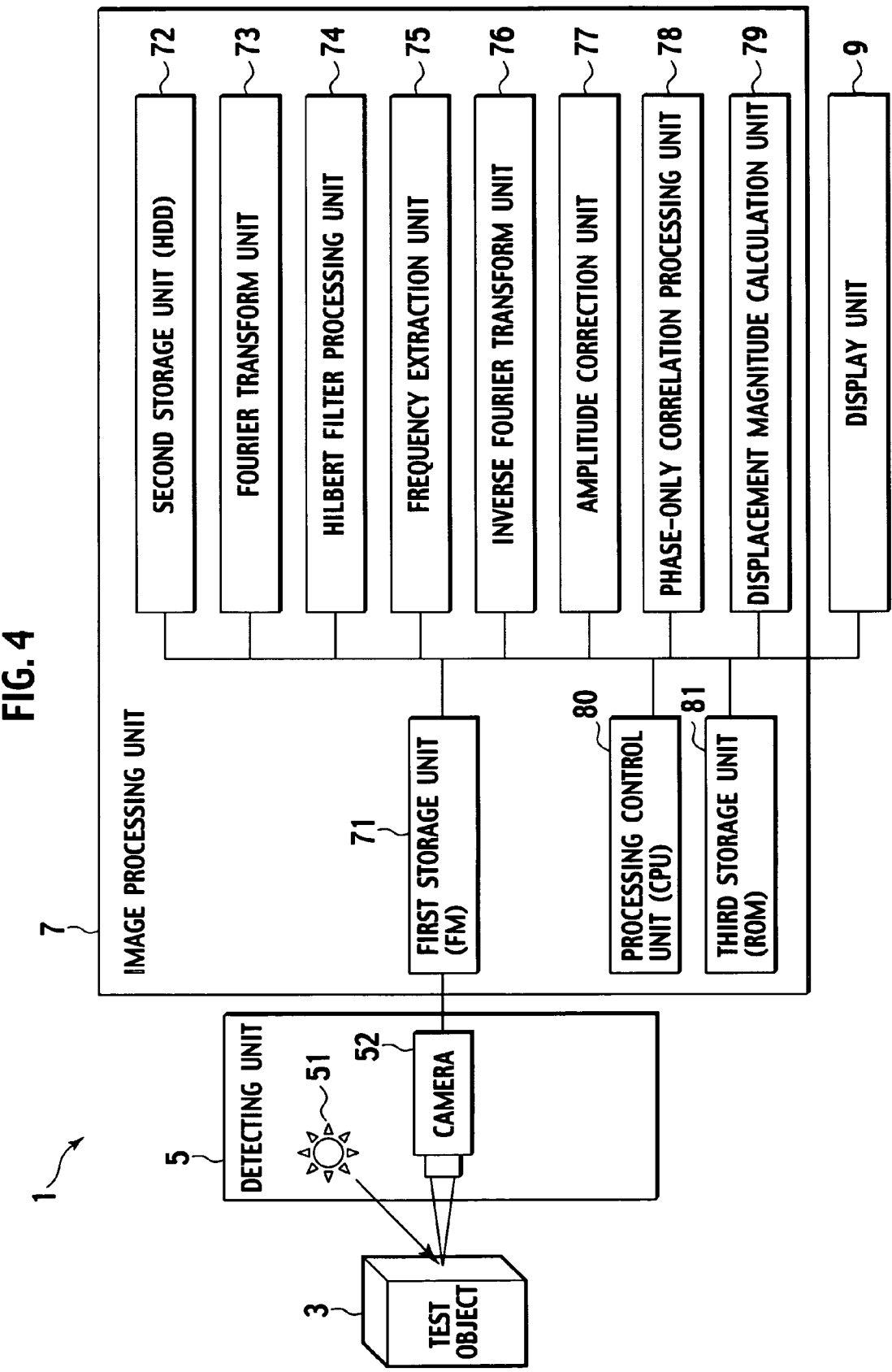
FIG. 4 is illustration for explaining the composition of a small displacement measuring apparatus 1 according to the present invention.

First of all, as shown to the block diagram of FIG. 4 and the flow chart of FIG. 5, the camera 52 is allocated in front of the test object 3 and the light outputted from the optical source 51 is irradiated to the test object 3. Thereafter, the speckle pattern of the before displacement observed on the surface of the test object and the speckle pattern by a peculiar texture to the surface are taken with the camera 52. And then, this speckle pattern (image of FIG. 1 at (a)) is temporarily stored in the FM 71. Thereafter, after the conversion to file is processed, this file is stored in the HDD 72 as a speckle pattern of the before displacement (Step S11 to S13).

Next, after the lapse the fixed time or a certain period, in this embodiment, it takes image of the test object 3 after the test object 3 is rotated by a condition same as the above-mentioned take image condition. And then, the obtained speckle pattern (image of FIG. 2 at (a)) is temporarily stored in the FM 71. Thereafter, this file is stored in the HDD 72 as a speckle pattern of the after displacement by then processing the conversion to file (Step S15 to S17).

Figure 6:
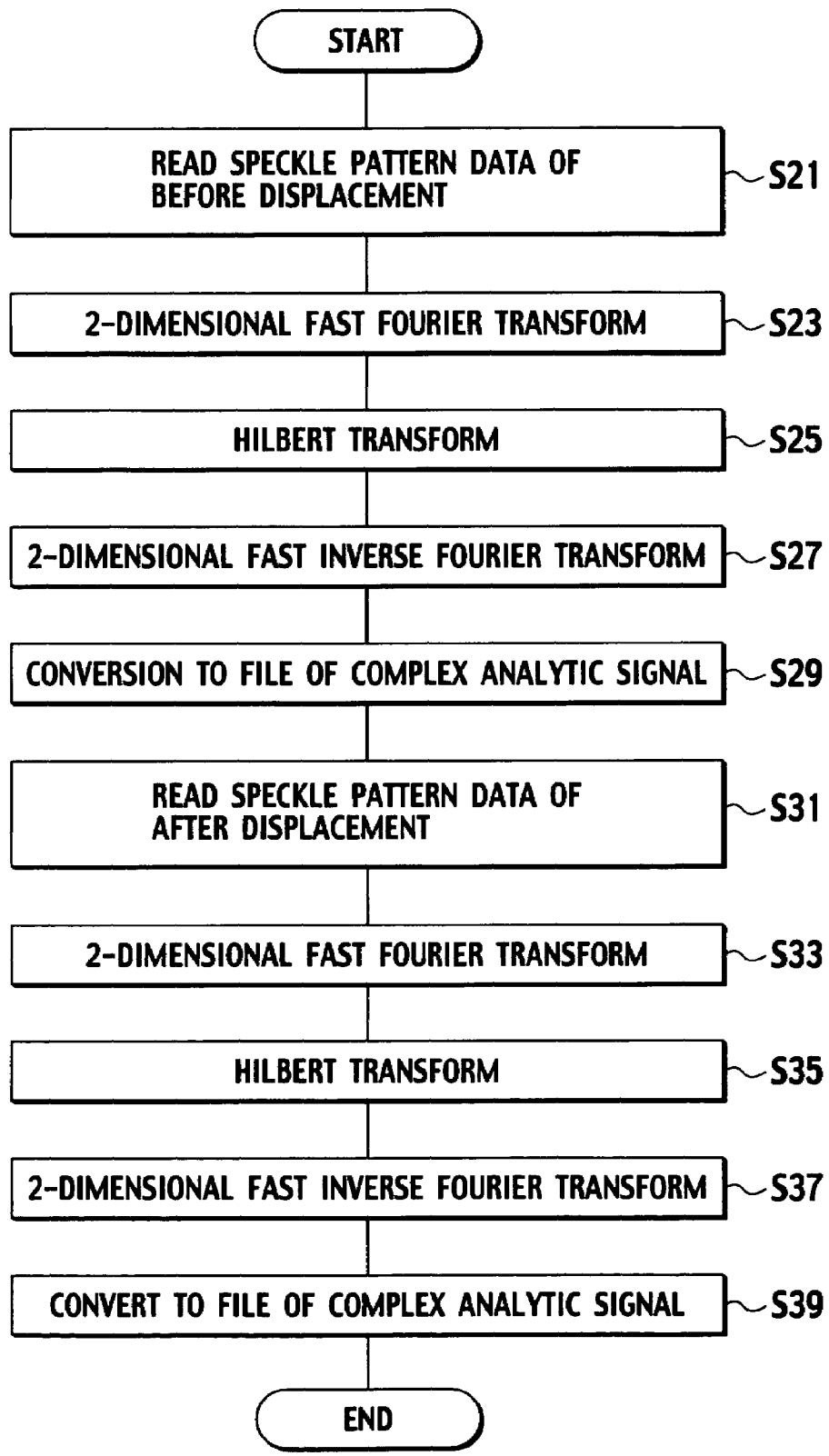
FIG. 6 is a flow chart (No. 2) for explaining an operation by the small displacement measuring apparatus 1 according to the present invention.

Here, the CPU 80 always monitors the speckle pattern information stored in the HDD 72, and when the latest speckle pattern (The speckle pattern of the after displacement is indicated here) is detected being stored, reads the speckle pattern that this speckle pattern (The speckle pattern of the before displacement is indicated here) is previous stored (Step S21 of FIG. 6).

And then, this before displacement speckle pattern is converted into the spatial frequency spectrum by the 2-dimensional fast Fourier transform executed by the Fourier transform unit 73 (Step S23). Next, this spatial frequency spectrum is executed by the Hilbert filter arithmetic processing in the Hilbert filter processing unit 74. That is, the process which replaces the amplitude of frequency spectrum in the left half of the in-plane including zero frequencies of the spatial frequency spectrum with zero is performed (Step S25). And then, the frequency component is extracted from the spatial frequency spectrum of the remainder of the right half, and converted into the complex analytic signal executed by the 2-dimensional fast inverse Fourier transform process in the inverse Fourier transform section 76 (Step S27). After the converted complex analytic signal is converted to a file, it stores in the HDD 72 again as a complex analytic signal of the before displacement (Step S29).

Next, the CPU 80 reads the speckle pattern of the after displacement from the HDD 72 (Step S31). And then, the Hilbert filter operation processing is executing after the 2-dimensional fast Fourier transform as much as the above-mentioned process, the frequency component are extracted from the spatial frequency spectrum, this is executed by the inverse Fourier transform again, and then the complex analytic signal is obtained. This complex analytic signal is stored in the HDD 72 as a complex analytic signal of the after displacement (Step S33 to S39).

Figure 7:
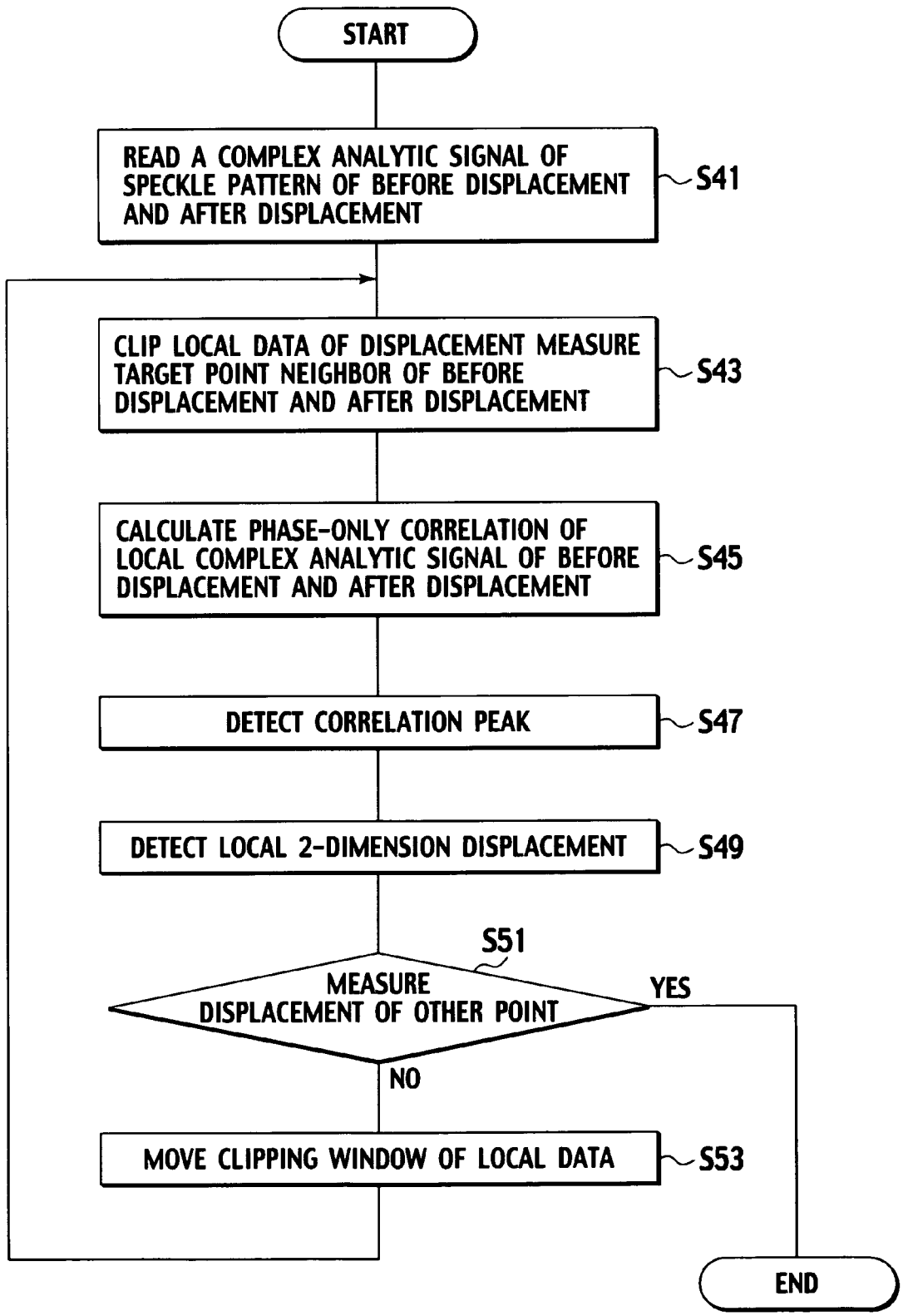
FIG. 7 is a flow chart (No. 3) for explaining an operation by the small displacement measuring apparatus 1 according to the present invention.

When the above-mentioned video signal processing is completed, the CPU 80 reads the complex analytic signal of the before displacement and the after displacement from the HDD 72 respectively (Step S41 of FIG. 7). And then, the local data of the complex analytic signal in the region where to be the measured local displacement is clipped by the small window W (Step S43). Next, the complex analytic signal before and after displacement calculated by making the amplitude to constant or the controlling the amplitude using the phase-only correlation function or the pseudo-phase limitation correlation function, and existence or nonexistence and the displacement magnitude of local displacement are obtained from the correlation peak location (Step S45 to S47). And then, it is detected whether or not there is a point to have to obtain local displacement somewhere else. If there is further a point to have to obtain displacement locally, clipping Wn of new local data is performed, it returns to Step S43 and the process of Step S43 to S49 are executed for this local. If the point to have to obtain the displacement magnitude locally does not exist in Step S51, this process is completed. The above-mentioned process contents including a calculation result on the way are monitored with a display of the display unit 9.

These a series of processing steps mentioned above are converted to the program beforehand and stored in the ROM 81. The CPU 80 drives each function unit arbitrarily reading this program and calculates the displacement magnitude. Moreover, although the displacement magnitude is calculated based on the speckle pattern in this embodiment, the displacement magnitude can calculate similarly by using a random dot pattern.

Next, the present invention will be compared with the technology of "patent documents 1", and the difference will be described.

Figure 8A:
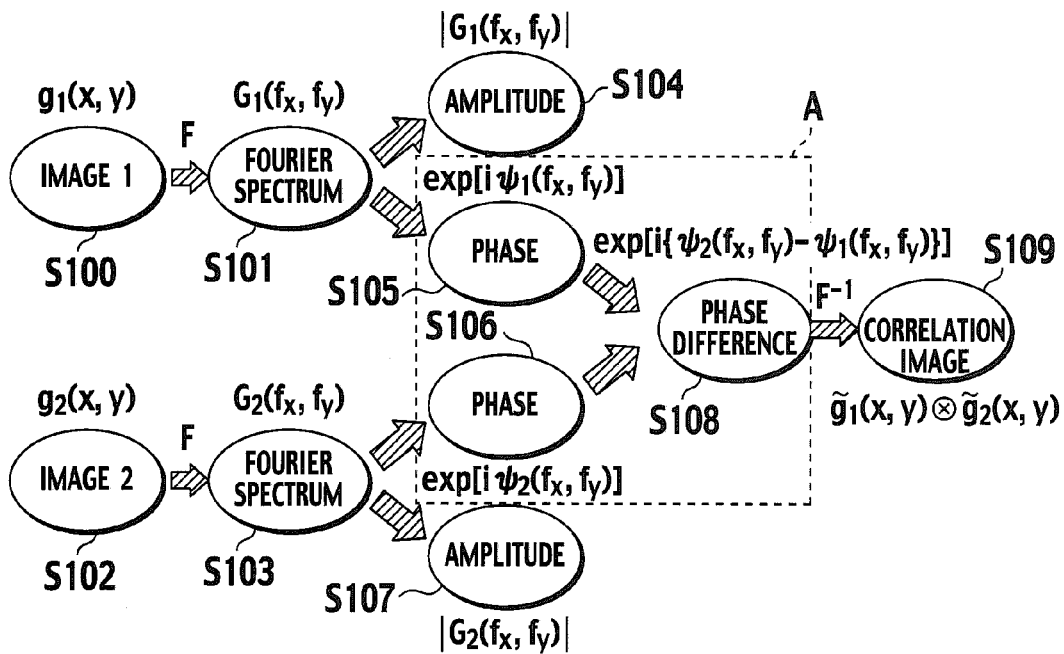
FIG. 8A is a flow chart showing conventional image processing steps.

In general, the method shown in FIG. 8A is known as the cross-correlation calculation method using the phase information. This conventionally method it controls by the Fourier spectrum

[Number 25]

$$G_1(f_x, f_y)$$

to obtain each of image 1 $g_1(x, y)$ and image 2

[Number 24]

$$g_2(x, y)$$

to try to obtain the cross-correlation executed by the Fourier transform and fixing the amplitude of the Fourier spectrum

[Number 26]

$$G_2(f_x, f_y)$$

to "1" or converts the logarithm (Step S100 to S103). And then, the phase difference

[Number 29]

$$\exp[i\{\phi_2(f_X, f_Y) - \phi_1(f_X, f_Y)\}]$$

of the complex signal is obtained in the spatial frequency domain (Step S108) by using only the phase information

[Number 27]

$$\exp[i\phi_1(f_x, f_y)]$$

of the spatial frequency spectrum of the before displacement and the phase information

[Number 28]

$$\exp[i\phi_2(f_x, f_y)]$$

of the spatial frequency spectrum of the after displacement (Step S104-S107) by taking and crossing another complex conjugate. And then, the method to which the correlation function

[Number 30]

$$\tilde{g}_1(x,y) \otimes \tilde{g}_2(x,y)$$

is obtained by processing this phase difference in the inverse Fourier transform (Step S109).

Therefore, since the phase information used by this method is a phase information of the spatial frequency spectrum, and the obtained correlation function is a correlation function of the entire global displacement of image 1 and image 2, the correlation function of local displacement in the arbitrary each point in the image cannot be obtained. Moreover, as mentioned above, since the amplitude control by the identification and the logarithmic function etc. of the amplitude of the spatial frequency spectrum may stress the high-frequency component of the spatial frequency spectrum, the problem of being susceptible to the modifying of the speckle and the influence of the noise occurs easily.

On the other hand, in the method according to the present invention, as shown from FIG. 1 to FIG. 7 and FIG. 8B, the correlation operation by the phase-only or the amplitude control is executed for not the spatial frequency spectrum region but the complex analytic signal of each image in the spatial signal domain. Therefore, the benefit of not being susceptible to the influence by the modifying of the noise and the speckle easily since the high-frequency component of the spatial frequency spectrum is never stressed occurs.

Figure 8B:
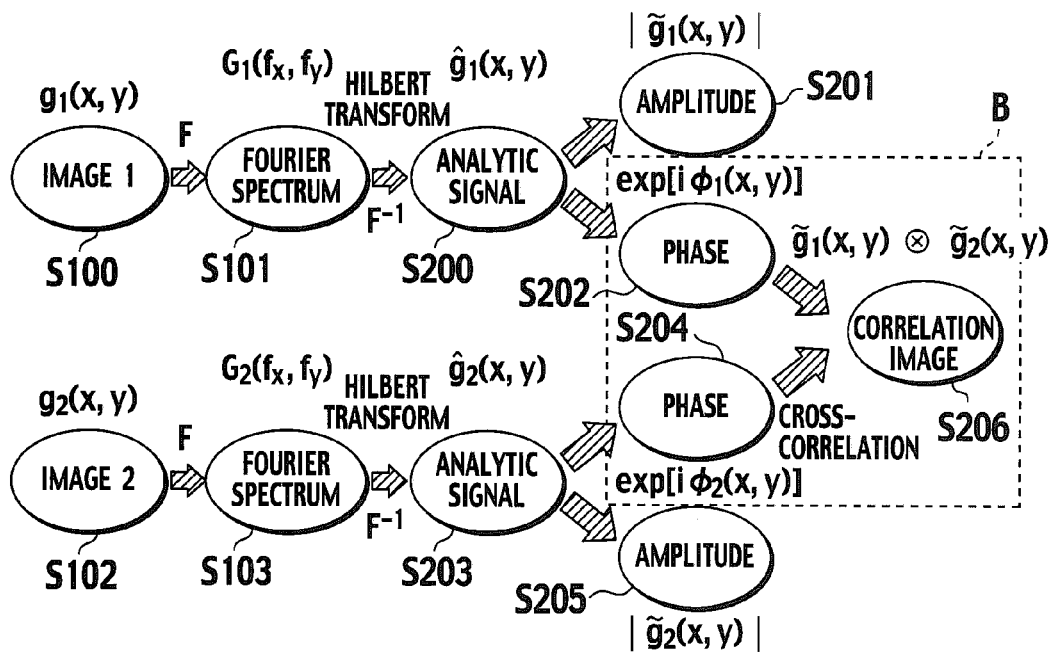
FIG. 8B is a flow chart showing image processing steps of the present invention.

That is, as shown to FIG. 8B, the Fourier spectrum

[Number 33]

$$G_1(f_x, f_y)$$

and the Fourier spectrum

[Number 34]

$$G_2(f_x, f_y)$$

are obtained by the Fourier transform of each of image 1

[Number 31]

$$g_1(x,y)$$

and image 2

[Number 32]

$$g_2(x,y)$$

to try to obtain the cross-correlation (Step S100 to S103). And then, the complex analytic signal

[Number 35]

$$\hat{g}_1(x,y)$$

and

[Number 36]

$$\hat{g}_2(x,y)$$

are obtained respectively by executing the Hilbert filter and then executing the inverse Fourier transform to these (Step S200 to S203). And then, by using only phase difference information

[Number 37]

$$\exp[i\phi_1(x,y)]$$

of each complex analytic signal and phase difference information

[Number 38]

$$\exp[i\phi_2(x,y)]$$

and taking and crossing another complex conjugate (Step S201, S202, S204, S205), the phase-only correlation function of the signal domain

[Number 39]

$$\tilde{g}_1(x,y) \otimes \tilde{g}_2(x,y)$$

is obtained (Step S206).

Thus, the process in the spatial frequency domain of area A shown to FIG. 8A and the signal domain in area B shown to process and FIG. 8B in are a quite different process contents. Moreover, the Hilbert filter process (Step S200) for obtaining the complex analytic signal is a new function in modulo without conventionally.

Moreover, the distribution of local displacement in each point of the image can be obtained by clipping a part of the complex analytic signal in that case by small window W and calculating the phase-only or the amplitude control correlation. In addition, the correlation function of global displacement of similar whole image to the conventional method can be obtained if the size of clip small window W is expanded at the time of the correlated calculation.

Figure 9A:
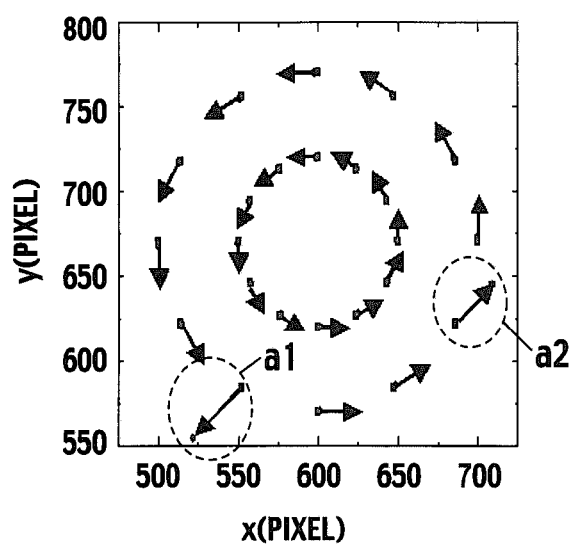
FIG. 9A is an example showing a result to obtain a distribution of a local displacement in each point on the surface of a test object from a movement of a white speckle pattern when a minute rotation is given to an object 3 according to a conventional method.
Figure 9B:
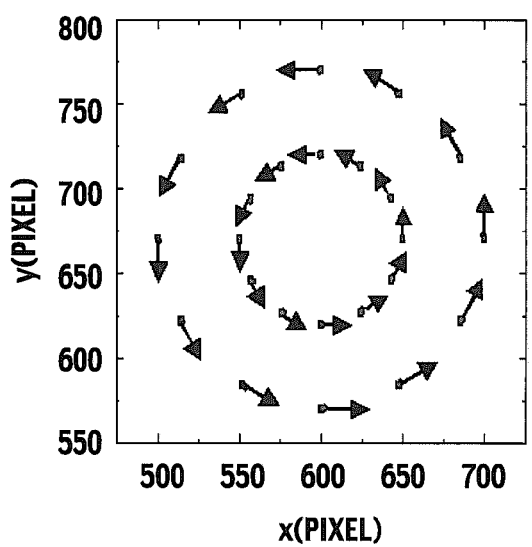
FIG. 9B is an example showing a result to obtain the distribution of the local displacement in each point on the surface of the object from the movement of the white speckle pattern when the minute rotation is given to the test object 3 according to the present invention.

Moreover, an example of the result of obtaining the distribution of local displacement in each point on the object side from the movement of a white speckle pattern when a minute rotation is given to the test object 3 is shown in FIGS. 9A and 9B. It is understood that displacement increases as a result in proportion to the distance from the rotation center. As shown in FIG. 9A, the measurement error occurs in conventional intensity correlation method if displacement grows and the modifying (de-correlation) of the shape of the speckle occurs (a1 and a2 enclosed with the dotted line in figure). On the other hand, as shown it to FIG. 9B, a correct measured output can be given to displacement large in the method in accordance with the present invention. The phase-only correlation modulo or the amplitude control correlation method in the spatial frequency domain which is another conventional method cannot obtain such local displacement distribution because of the constraint in the principle since the global correlation in the whole area of the image is given as mentioned above.

Figure 10A:
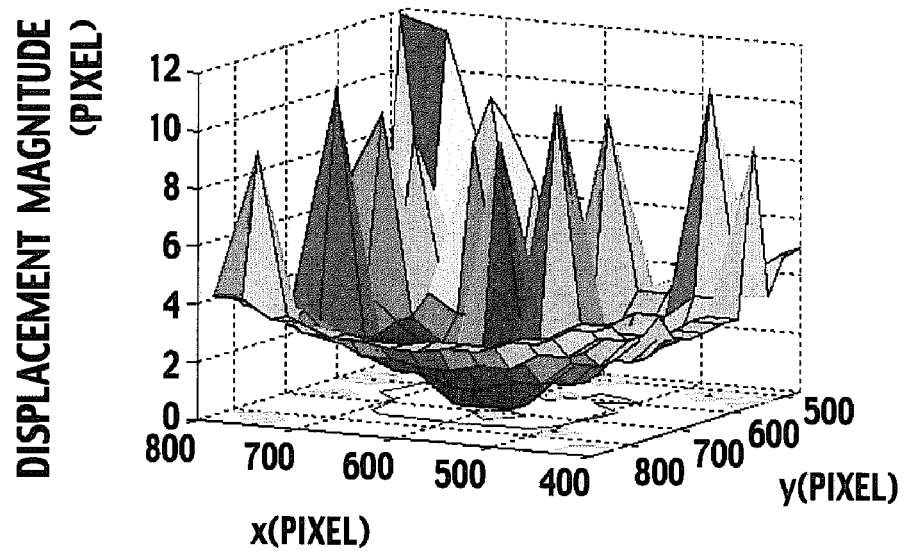
FIG. 10A is an example showing a result when a small displacement is given by reducing rotating angle according to a conventional method.
Figure 10B:
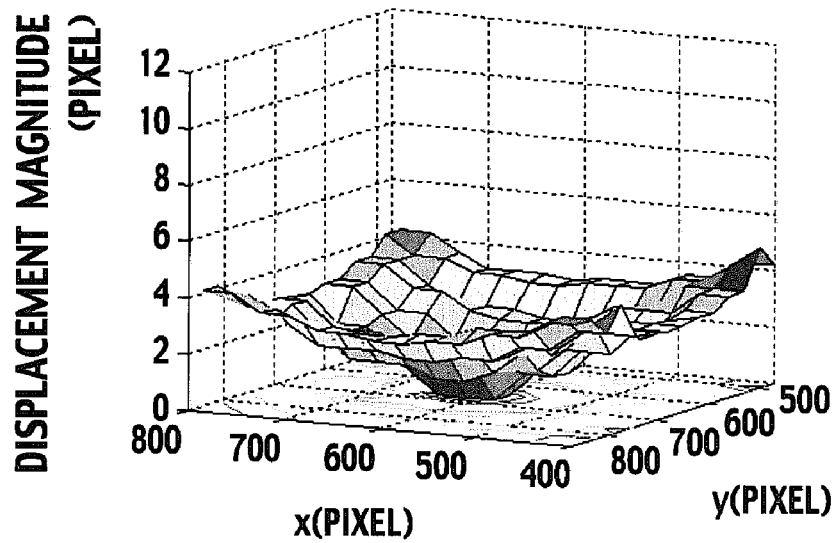
FIG. 10B is an example showing a result when the small displacement is given by reducing rotating angle according to the present invention.

By the way, although FIGS. 9A and 9B shows the advantage of the present invention in the detection of large displacement, FIGS. 10A and 10B show the advantage of the present invention at the time when the rotating angle is reduced oppositely and the small displacement is given. The longitudinal axis in the graph of FIGS. 10A and 10B show the size of the displacement magnitude. Since proportion of displacement to the distance from the rotation center though an ideal measured output becomes like a reverse-cone, a lot of measurement errors are contained in the intensity correlation of the conventional method as shown in FIG. 10A. On the other hand, a near measured output is nearly obtained for very minute displacement like the cone in the method in accordance with the present invention as shown in FIG. 10B.

Figure 11A:
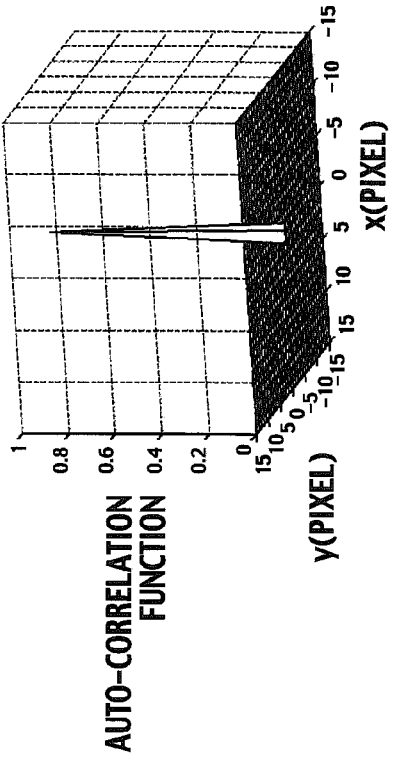
FIG. 11A is an illustration showing an auto-correlation function of a speckle pattern by a phase-only correlation function in a spatial signal domain according to a method of the present invention.
Figure 11B:
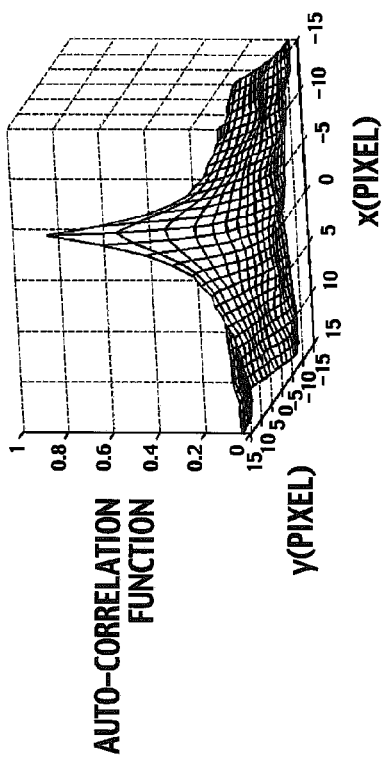
FIG. 11B is an illustration showing an auto-correlation function of the speckle pattern by the phase-only correlation function in a spatial frequency domain according to a conventional method.
Figure 11C:
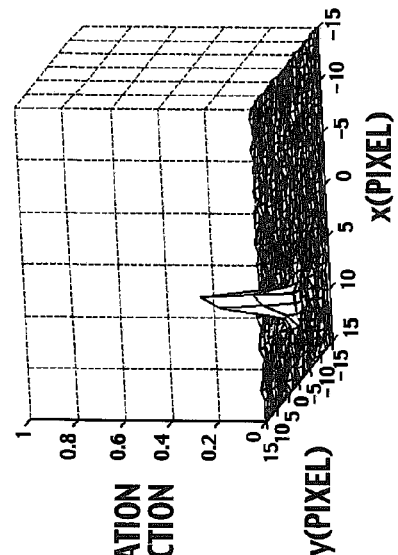
FIG. 11C is an illustration showing a cross-correlation function of the speckle pattern by the phase-only correlation function in the spatial signal-domain by the method of the present invention.
Figure 11D:
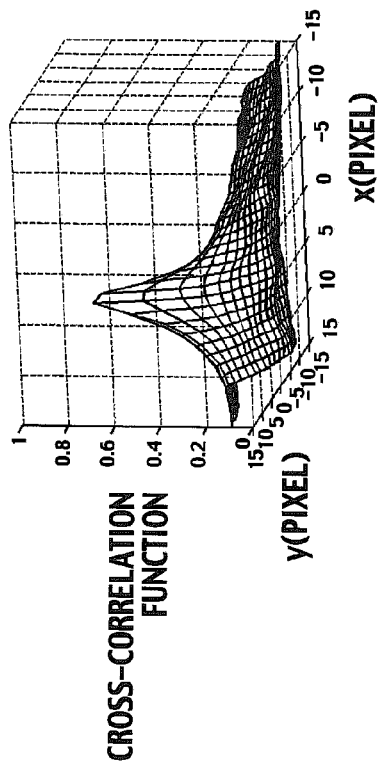
FIG. 11D is an illustration showing a cross-correlation function of the speckle pattern by the phase-only correlation function in the spatial frequency domain according to a conventional method.

As mentioned above, the comparison of the performance with the present method is done about the case where the entire object is displaced uniformly, since the phase-only or the amplitude control correlation method in the spatial frequency domain of the conventional method was not able to be applied to the local measurement of displacement. FIG. 11A is an illustration showing the auto-correlation function of the speckle pattern by the phase-only correlation function in the spatial signal domain according to the method of the present invention. As shown in FIG. 11B, since the spreading width of the correlation function is larger than the auto-correlation function of the speckle pattern by the phase-only correlation function in the spatial frequency domain of the conventional method, there is no advantage about the resolving power of the auto-correlation function. However, as shown in FIG. 11D, the height of the peak decreases to the cross-correlation function by the phase-only correlation function in the spatial frequency domain according to the conventional method. On the other hand, since the cross-correlation function in the spatial signal domain in accordance with the present invention shown in FIG. 11C maintains a high correlation peak, a high measurement of the reliability is possible. Since the laser speckle is transformed by the displacement, when the displacement magnitude grows and the modifying of the speckle is intense, the advantage of a method in accordance with the present invention becomes more remarkable.

Figure 12A:
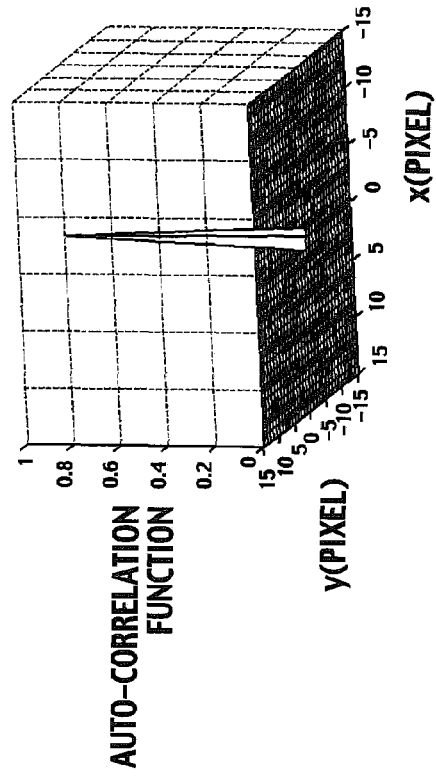
FIG. 12A is an illustration showing an auto-correlation function of the speckle pattern by the phase-only correlation function in the spatial signal-domain according to a method of the present invention when the modifying of a speckle is large.
Figure 12C:
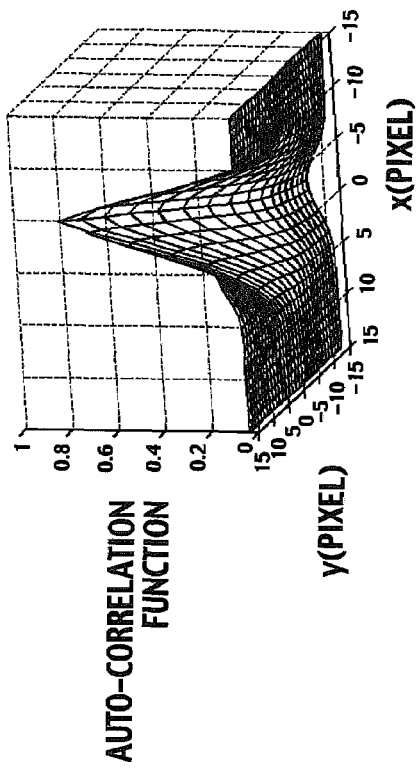
FIG. 12C is an illustration showing a cross-correlation function of the speckle pattern by the phase-only correlation function in the spatial signal-domain according to a method of the present invention when the modifying of the speckle is large.
Figure 12B:
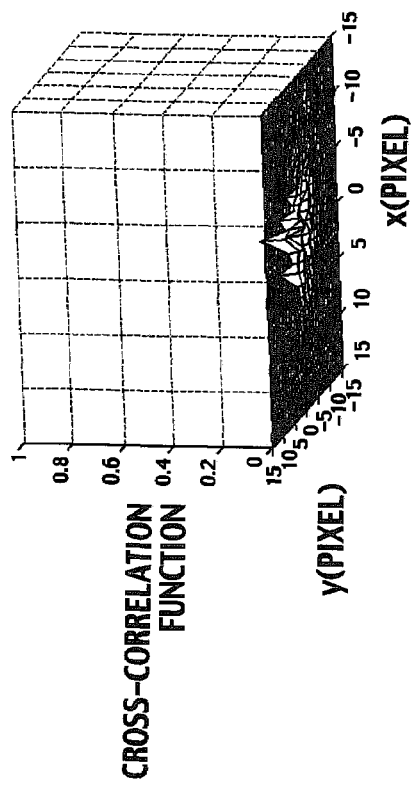
FIG. 12B is an illustration showing an auto-correlation function of the speckle pattern by the phase-only correlation function in the spatial frequency domain according to a conventional method when the modifying of the speckle is large.
Figure 12D:
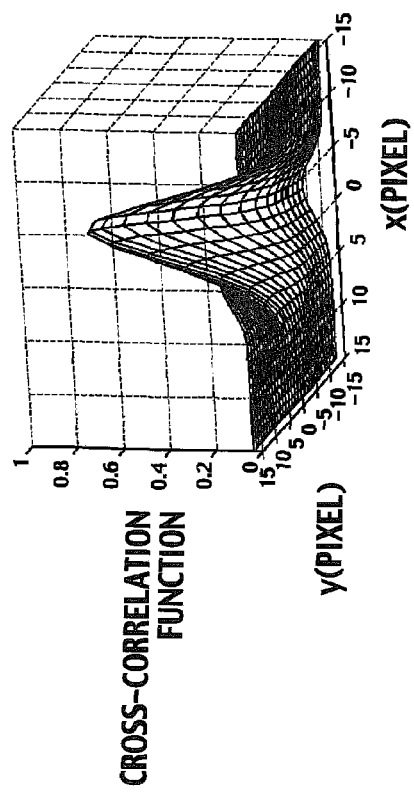
FIG. 12D is an illustration showing a cross-correlation function of the speckle pattern by the phase-only correlation function in the spatial frequency domain according to a conventional method when the modifying of the speckle is large.

FIGS. 12A to 12D are illustrations comparing cross-correlation functions when large of the modifying of the speckle. FIGS. 12A and 12B are the method (phase-only correlation function in the spatial signal domain) in accordance with the present invention and the conventional method (phase-only correlation function in the spatial frequency domain) for auto-correlation functions respectively. In this case, since there is no modifying of the speckle, there is no advantage to conventional method. However, as shown in FIG. 12D, the height of the peak of the cross-correlation function unreasonably decreases to the conventional method (phase-only correlation function in the spatial frequency domain). On the other hand, a high measurement of the reliability is possible for large of the modifying of the speckle since a high correlation peak is maintained as for the cross-correlation function according to the present invention (phase-only correlation function in the spatial signal-domain) shown in FIG. 12C.

INDUSTRIAL APPLICABILITY

A highly accurate small displacement measurement is enabled from the above-mentioned by using a unique speckle pattern which exists on the surface of the test object according to the present invention. As a result, for example, the displacement of the object surface based on the microdefect which occurs in metallic materials such as the semiconductor element, the body or the wing of the aircraft or bodies can be detected in a noncontact way. Moreover, since expecting the metal fatigue and secular change by regularly performing this inspection is possible, it is possible to use it as an non destructive inspection system in which the break etc. are prevented beforehand. Moreover, the application as the personal identification that uses the speckle pattern and the security apparatus are also possible since it is possible to measure even in the place where the environment.

We claim:

1. A method for measuring small displacement to measure small displacement of an object in a non-contact manner, the method comprising:

a first taking image step for taking a first image of a surface of a measuring object;

a first Fourier transform step for transforming the first image taken by the first take image step by using an N-dimensional Fourier transform (where N=1 or 2);

a first Hilbert transform step for replacing an amplitude of frequency spectrum of half or a part of in-plane including zero first frequency of the frequency spectrum transformed by the first Fourier transform step with zero;

a first frequency extraction step for extracting a first frequency component from the first frequency spectrum after the first Hilbert transform step;

a first inverse Fourier transform step for transforming the first frequency component by using an N-dimension inverse Fourier transform (where N=1 or 2) and then obtaining a first complex analytic signal;

a first amplitude correction step for correcting an amplitude value of the first complex analytic signal as being a constant value;

a first phase-only signal recording step for recording a first phase-only analytic signal to which the amplitude is corrected;

a second take image step for taking a second image of the surface of the measuring object, on the other hand, after the first taking image step;

a second Fourier transform step for transforming the second image taken by the second taking image step by using the N-dimensional Fourier transform (where N=1 or 2);

a second Hilbert transform step for replacing an amplitude of frequency spectrum of half or a part of in-plane including zero frequency of the second frequency spectrum transformed by the second Fourier transform step with zero;

a second frequency extraction step for extracting a second frequency component from the frequency spectrum after the second Hilbert transform step;

a second inverse Fourier transform step for transforming the second frequency component by using an N-dimension inverse Fourier transform (where N=1 or 2) and then obtaining a second complex analytic signal;

a second amplitude correction step for correcting an amplitude value of the second complex analytic signal as being a constant value;

a second phase-only signal recording step for recording a second phase-only analytic signal to which the amplitude is corrected;

a phase-only correlation processing step for obtaining a phase-only cross-correlation function to entire region or a part of region of the first phase-only analytic signal and the second phase-only analytic signal; and a displacement magnitude calculation step for calculating displacement magnitude from a location of correlation peak to which the phase-only cross-correlation function shows a maximum modulus.

2. The method of claim 1, wherein the first and the second amplitude correction step use one of a amplitude-only processing method for replacing the amplitude value of the first and the second complex analytic signal with constant value, and an amplitude suppression processing method for controlling the amplitude value of the first and the second complex analytic signal to constant value by logarithmic conversion.

3. The method of claim 1, wherein in the phase-only cross-correlation process executed by the phase-only correlation processing step, one of a amplitude-only cross-correlation function and a amplitude suppression cross-correlation function is used.

4. An apparatus for measuring small displacement to measure small displacement of an object in a non-contact manner, the apparatus comprising:

taking first and second image means for taking first and second images of a surface of a measuring object;

Fourier transform means for transforming the first and second images taken by the taking first and second image means by using an N-dimensional Fourier transform (where N=1 or 2);

Hilbert transform means for replacing an amplitude of frequency spectrum of half or a part of in-plane including zero frequency of the first and second frequency spectrum transformed by the Fourier transform means with zero, respectively;

frequency extraction means for extracting a first and second frequency component, respectively, from the first and second frequency spectrum included in region other than a zero replacing region replaced with zero by the Hilbert transform means;

inverse Fourier transform means for transforming the first and second frequency component respectively extracted by the frequency extraction means by using an N-dimension inverse Fourier transform, and then outputting a first and second complex analytic signal;

amplitude correction means for correcting an amplitude value of the first and second complex analytic signal as being a constant value, respectively;

Phase-only correlation processing means for processing a phase-only correlation process to entire region or a part of region of the first and second signal respectively correcting by the amplitude correction means; and displacement magnitude calculation means for calculating displacement magnitude from a location of correlation peak showing a maximum modulus of the phase-only correlation function.

5. The apparatus of claim 4, wherein the amplitude correction section comprises one of a phase-only processing means for replacing the amplitude value of the first and second complex analytic signal with constant value respectively, and an amplitude suppression processing means for controlling the amplitude value of the first and second complex analytic signal to constant value by logarithmic conversion respectively.

6. The apparatus of claim 4, wherein the phase-only cross-correlation processing means use one of a amplitude-only cross-correlation function and a amplitude suppression cross-correlation function.

* * * * *